(12) United States Patent
Lim

(10) Patent No.: US 6,784,969 B1
(45) Date of Patent: Aug. 31, 2004

(54) LIQUID CRYSTAL DISPLAY PANEL AND METHOD OF INJECTING LIQUID CRYSTAL INTO THE DISPLAY PANEL

(75) Inventor: Joo-Soo Lim, Kumi (KR)

(73) Assignee: LG. Philips LCD Co., Ltd, Seoul (KR)

( * ) Notice: Subject to any disclaimer, the term of this patent is extended or adjusted under 35 U.S.C. 154(b) by 251 days.

(21) Appl. No.: 09/714,138

(22) Filed: Nov. 17, 2000

(51) Int. Cl.$^7$ ............................................. G02F 1/1341
(52) U.S. Cl. ...................... 349/189; 349/153; 349/187; 349/190
(58) Field of Search ................................ 349/153, 154, 349/187, 189, 190

(56) References Cited

U.S. PATENT DOCUMENTS 5,335,103 A * 8/1994 Kim ........................... 349/154
5,583,671 A * 12/1996 Yoshida et al. ................ 349/93
5,751,391 A * 5/1998 Yokoyama et al. .......... 349/153
5,835,181 A * 11/1998 Nakamura et al. .......... 349/189
6,095,203 A * 8/2000 Yamamoto et al. ........... 141/59
6,285,435 B1 * 9/2001 Inoue et al. ................. 349/189

* cited by examiner

*Primary Examiner*—Dung T. Nguyen
*Assistant Examiner*—P. R. Akkapeddi
(74) *Attorney, Agent, or Firm*—Birch, Stewart, Kolasch & Birch, LLP

(57) ABSTRACT

Liquid crystal material is introduced into a liquid crystal panel having upper and lower substrates and a seal pattern having an injection port at a peripheral portion thereof including, preparing an open portion that elongates from the injection port to a side of the lower substrate. The liquid crystal material is in a tray having a protruded portion corresponding in shape to the open portion. The protruded portion of the tray is inserted into the injection port, so that the liquid crystal material in the tray can be injected into the panel through the protruded portion and the injection port. After the injection process, there is no need to clean the panel, because liquid crystal material does not contaminate the outside of the panel.

19 Claims, 4 Drawing Sheets

LIQUID CRYSTAL DISPLAY PANEL AND METHOD OF INJECTING LIQUID CRYSTAL INTO THE DISPLAY PANEL

BACKGROUND OF THE INVENTION

1. Field of the Invention

The invention relates to a liquid crystal display (LCD) panel, and to a method of injecting liquid crystal material to the LCD panel.

2. Description of Related Art

A liquid crystal panel for a liquid crystal display (LCD) device has upper and lower substrates between which is disposed liquid crystal material. According to the conventional art, the liquid crystal material is generally interposed between the two substrates by a dipping method, which is explained with reference to FIGS. 1 and 2. Hereinafter, the term "liquid crystal panel" refers to a panel whose liquid crystal injection space is not filled with liquid crystal material, i.e., a panel without liquid crystal material between the substrates 1 and 2.

Switching elements and other layers (not shown) are formed on the lower substrate 2. On the upper substrate 1 there are generally formed color filters and black matrix (not shown). The upper substrate 1 is smaller than the lower substrate 2, and there is a plurality of data pads 6 and gate pads 7 in FIG. 1. The data and gate pads 6 and 7 are arranged in a double bank type adopted for a large LCD having high resolution. The double bank type has data and gate pads arranged on opposite sides of the lower substrate 2.

In order to assemble the upper and lower substrates, seal patterns 3 are printed in advance in the lower substrate 2. The seal patterns 3 include an open passage 4 for liquid crystal material.

FIG. 3 shows filling a liquid crystal panel with liquid crystal material according to the conventional art. A cassette 8 holding a liquid crystal panel 10 is dipped in a tray 11 containing liquid crystal material 9. The space defined by the seal pattern was evacuated in advance. The injection port 4 heads into the tray 11 and is covered by liquid crystal material 9. The liquid crystal material then is drawn by capillary action into the space defined by the seal patterns 3.

As described above, a portion of the liquid crystal panel 10 dips into the tray 11. As a result, the liquid crystal material remains on the panel 10 after interposing the liquid crystal material into the panel 10. FIG. 3 shows some of the data pads 6 submerged in the liquid crystal material 9 which may contaminate or pollute the pads 6. Thus, the liquid crystal material remaining on the panel 10 should be removed through additional processing.

FIG. 4 shows another example of liquid crystal panel 10a which has seal patterns 3 having an open passage 4 in a corner. This type of configuration can minimize the submerged portion of the panel 10a. However, this configuration also requires another cleaning process.

As has been shown, the two examples of conventional methods of dip filling a liquid crystal panel require submersion of at least a portion of the panel. As a result, the liquid crystal panel becomes contaminated with excess liquid crystal and must be cleaned. Additionally, the dip filling method wastes valuable liquid crystal material. As a result, dip filling yields high fabrication costs. Accordingly, liquid crystal panels and filling methods are needed which will minimize contamination and waste of materials.

SUMMARY OF THE INVENTION

The invention is directed at introducing liquid crystal material into a liquid crystal panel in a fashion that obviates problems due to limitations and disadvantages of the related art.

The invention provides a method of injecting liquid crystal material into a liquid crystal panel which reduces fabricating costs by reducing wasted liquid crystal material and by eliminating the cleaning process for residual liquid crystal material.

The invention, in part, provides a method of injecting liquid crystal material into a liquid crystal panel having upper and lower substrates and a seal pattern having an injection port at a peripheral portion thereof, the liquid crystal panel including an open portion that elongates from the injection port to a side of the lower substrate. Filling the liquid crystal panel is accomplished by preparing a tray having a body defining a cavity therein, and a protruded portion extending from the body corresponding to the open portion in the liquid crystal panel. The tray is filled with liquid crystal material. The protruded portion of the tray is attached to the injection port, so that the liquid crystal material in the tray can be injected into the panel through the protruded portion and the injection port.

The invention, in part, provides the open portion of the lower substrate with a wider width than the injection port, so that the liquid crystal material can be easily injected.

Another aspect of the invention, in part, provides a liquid crystal display panel, including: an upper substrate; a lower substrate assembled with the upper substrate, liquid to crystal material interposed between the upper and lower substrates; and a seal pattern formed between the upper and lower substrates. The invention further provides a seal pattern having an injection port so that the lower substrate has an open portion that elongates from the injection port to a side of the lower substrate.

Another aspect of the invention, in part, provides a tray for introducing liquid crystal material into a liquid crystal panel. The tray has a body defining a cavity, and extending from the body is a protruded portion corresponding to an opening in the liquid crystal panel.

Another aspect of the invention, in part, provides a system for filling a liquid crystal material into a liquid crystal panel. The system includes a liquid crystal display panel having an upper substrate, a lower substrate, and an open portion that elongates from an injection port to a side of the lower substrate. The system also includes a tray having a body defining a cavity, and extending from the body is a protruded portion corresponding to the opening in the liquid crystal panel.

It is to be understood that both the foregoing general description and the following detailed description are exemplary and explanatory and are intended to provide further explanation of the invention as claimed.

BRIEF DESCRIPTION OF THE DRAWINGS

The accompanying drawings are included to provide a further understanding of the invention. The drawings illustrate embodiments of the invention and together with the description serve to explain the principles of the embodiments of the invention.

DETAILED DESCRIPTION OF PREFERRED EMBODIMENTS

Advantages of the present invention will become more apparent from the detailed description given herein after. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
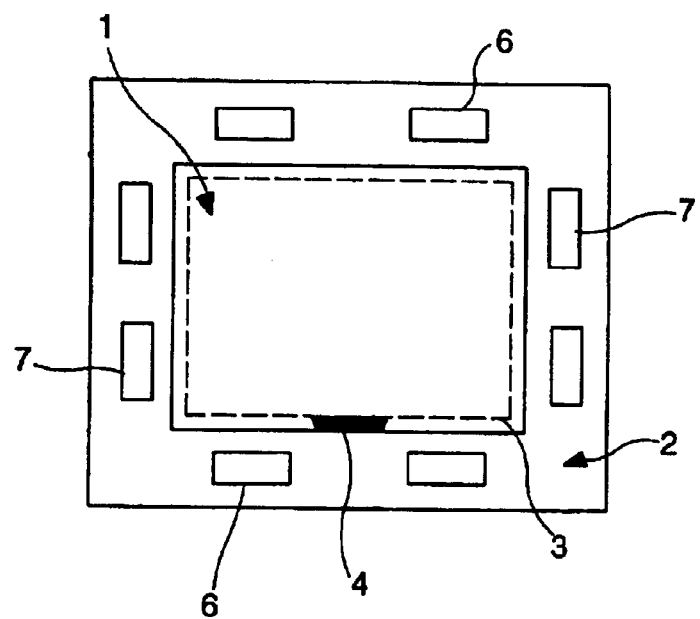
FIG. 1 is a plan view of a liquid crystal panel according to a conventional art.
Figure 2:
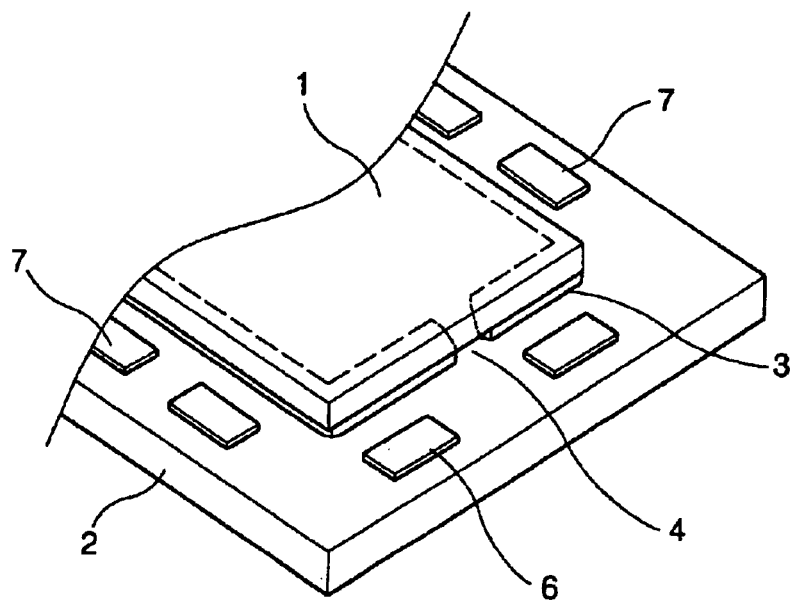
FIG. 2 is a partial perspective view of FIG. 1.
Figure 3:
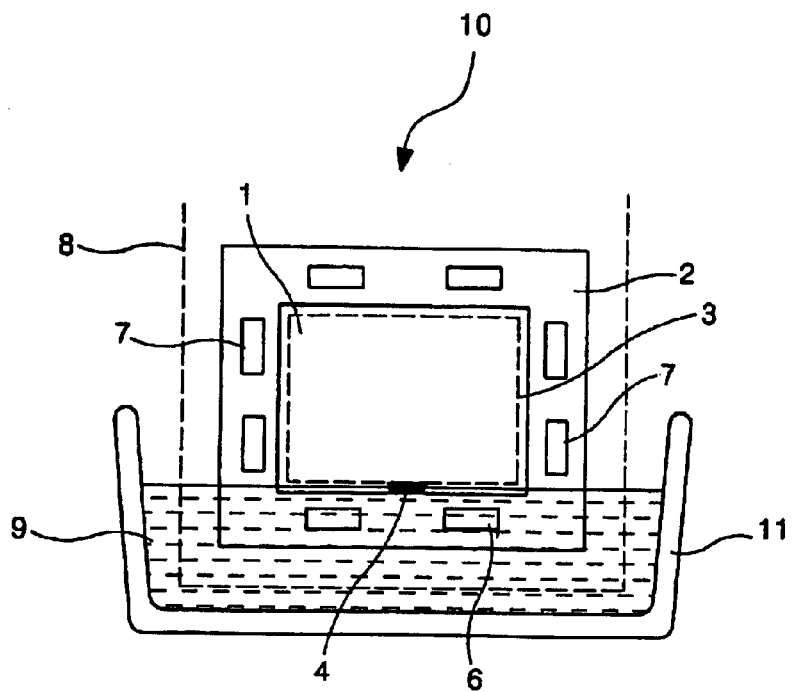
FIG. 3 is a view illustrating a conventional method of injecting liquid crystal material into the liquid crystal panel of FIG. 1.
Figure 4:
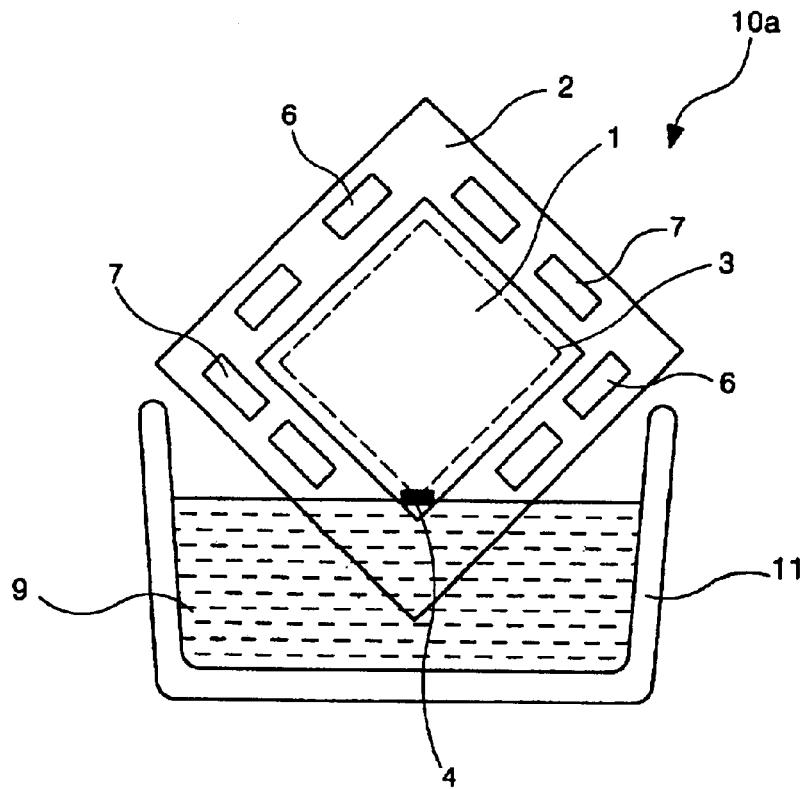
FIG. 4 illustrates a conventional method of injecting liquid crystal material into another liquid crystal panel.
Figure 5:
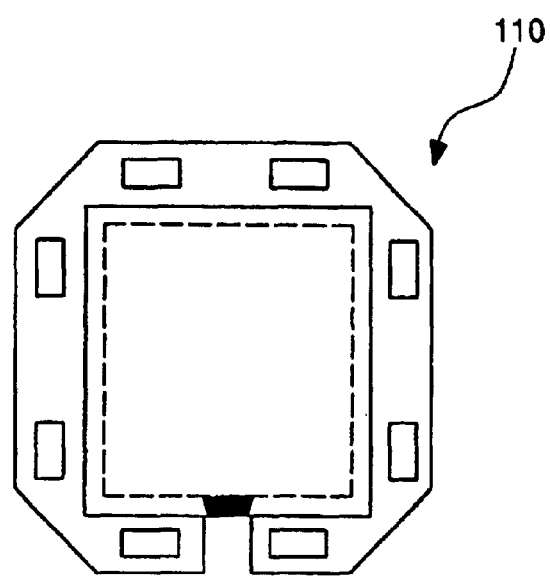
FIG. 5 is a plan view illustrating a liquid crystal panel according to a preferred embodiment of the present invention.
Figure 6:
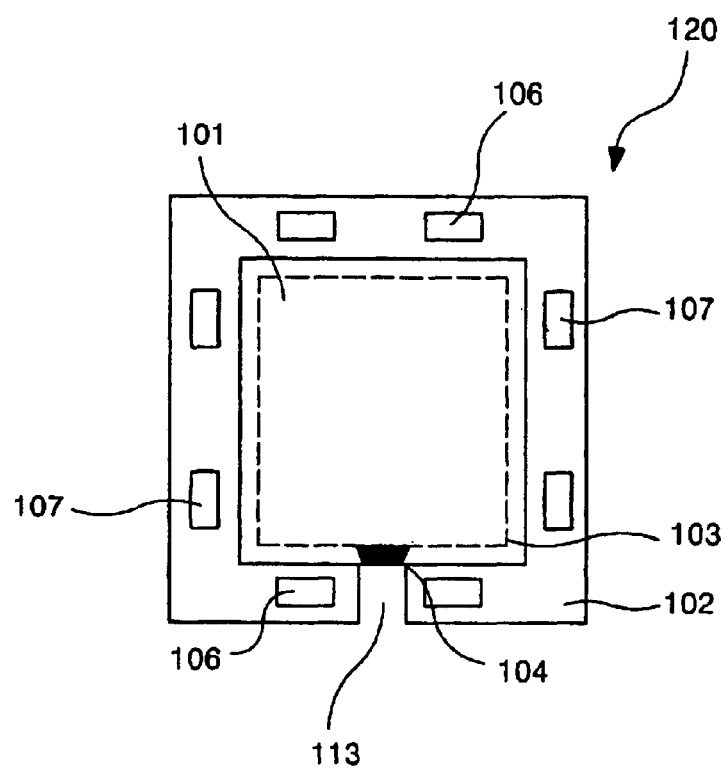
FIG. 6 is a plan view illustrating a liquid crystal panel having different shape from that shown in FIG. 5 according to the preferred embodiment of the present invention.
Figure 7:
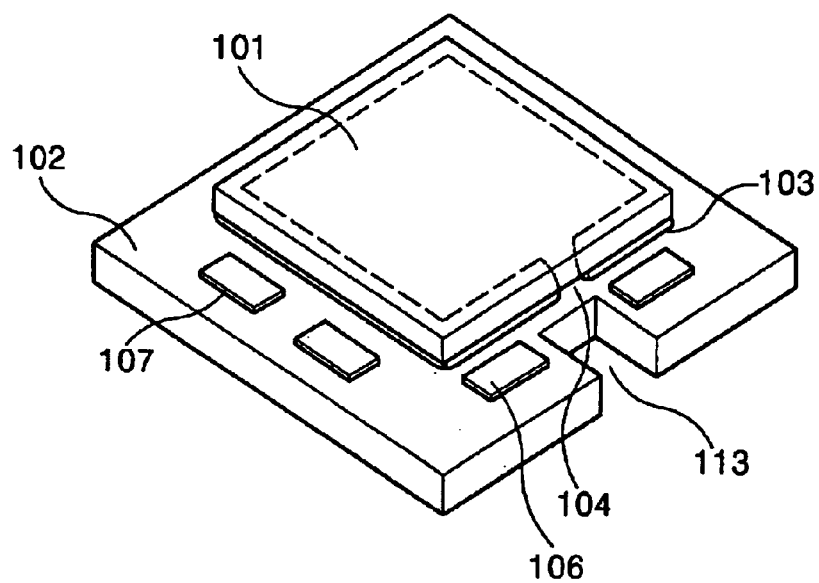
FIG. 7 is a perspective view of the liquid crystal panel of FIG. 6.

FIGS. 5 and 6 show liquid crystal panels according to the invention. The liquid crystal panel 110 of FIG. 5 is of a shape typically used in the avionic field and so is octagonal rather than being rectangular or square in shape. The liquid crystal panel 120 of FIG. 6 has a more typical shape than, but is similar to, the avionic liquid crystal panel shown in FIG. 5. The following description focuses on the liquid crystal panel 120 of FIGS. 6 and 7.

The panel 120 has upper and lower substrates 101 and 102, respectively. The upper substrate 101 can be smaller than the lower substrate 102. The lower substrate 102 has data pads 106 and gate pads 107. Although the arrangement of the data and gate pads 106 and 107 is double bank type having corresponding pads arranged at opposite sides, the invention can be applied to a single bank type that has data pads 106 or gate pads 107 are arranged along one side of the substrate 102, respectively. Between the upper and lower substrates 101 and 102, a seal pattern 103 is formed for assembling the two substrates 101 and 102. The seal pattern 103 has an injection port 104 in its side. The lower substrate 102 has an open portion (or indentation or notch) 113 that extends from the injection port 104 to the corresponding side of the lower substrate 102. Preferably, the open portion 113 has a wider width that the injection port 104.

Figure 8:
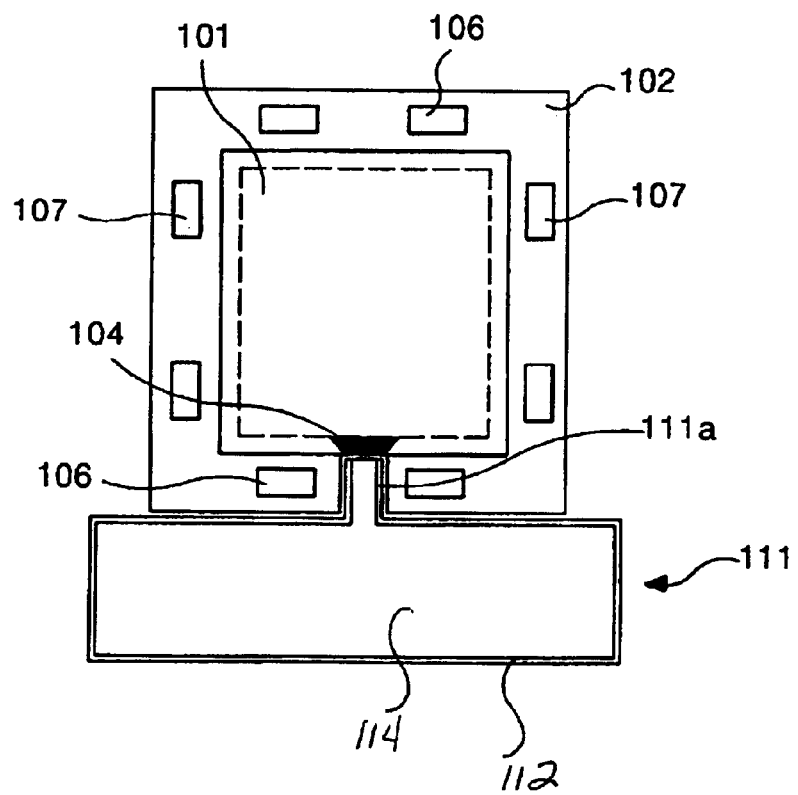
FIG. 8 is view illustrating a method of injecting liquid crystal material into the liquid crystal panel of FIG. 6 according to the invention.

FIG. 8 shows a tray 111 containing liquid crystal material to be injected into the panel 120. The tray 111 has a body 112 defining a cavity 114, the body 112 having a protruded portion 111a corresponding to the shape of the open portion 103 of the lower substrate 102 of the panel 120. A terminal of the protruded portion 111a preferably has a wider width than the injection port 104 of the panel 120. The terminal of the protruded portion 111a is open, so that the liquid crystal material in the tray 111 can be introduced or injected into the panel 120. Sticking the protruded portion 111a of the tray 111 into the injection port 104 of the panel 120 initiates the introduction process. The principle of the introduction process is capillary action, as in the conventional art, i.e., the liquid crystal material is drawn into the panel 120. Alternatively, the liquid crystal material could be pressurized to help transfer it from the tray 111 into the liquid crystal panel 120.

Although one injection port 104 is shown, multiple injection ports can be used for large sized panels. The introduction or injection method according to the invention does not contaminate or pollute the panel during the injection process. Thus a cleaning process is no longer needed. As a result, the invention achieves low production cost while producing non-polluted liquid crystal panels.

It is to be understood that the foregoing descriptions and specific embodiments shown herein are merely illustrative of the best mode of the invention and the principles thereof, and that modifications and additions may be easily made by those skilled in the art without departing for the spirit and scope of the invention, which is therefore understood to be limited only by the scope of the appended claims.

What is claimed is:

1. A method of filling a liquid crystal material into a liquid crystal display panel which comprises:

providing the liquid crystal display panel having an upper substrate, a lower substrate and a seal pattern having an injection port at a peripheral portion of the seal pattern;

preparing an indentation that is indented from a side of the lower substrate to the injection port;

providing a tray having a protruded portion corresponding to the open portion;

filling the tray with the liquid crystal material;

inserting the protruded portion into the injection port; and introducing the liquid crystal material into the liquid crystal display panel through the protruded portion and the injection port.

2. The method of claim 1, wherein the indentation has a wider width than the injection port, so that the liquid crystal material can be easily injected.

3. The method of claim 1, wherein the introducing of the liquid crystal is performed using capillary action.

4. The method of claim 1, wherein the upper substrate is smaller than the lower substrate.

5. The method of claim 4, wherein the lower substrate has a plurality of data pads and gate pads disposed on the lower substrate.

6. The method of claim 5, wherein the data pads and gate pads comprise a double bank arrangement having corresponding pads arranged at opposite sides of the lower substrate.

7. The method of claim 5, wherein the data pads and gate pads comprise a single bank arrangement having the data pads or the gate pads arranged along one side of the substrate, respectively.

8. The method of claim 1, wherein the seal pattern is printed in advance on the lower substrate.

9. A liquid crystal display panel comprising: an upper substrate;

a lower substrate assembled with the upper substrate, the lower substrate having an indentation that is indented from a side of the lower substrate to an injection port;

liquid crystal material interposed between the upper and lower substrates; and a seal pattern formed between the upper and lower substrates, the seal pattern having an injection port.

10. The liquid crystal display panel of claim 9, wherein the indentation has a wider width than the injection port.

11. The liquid crystal display panel of claim 9, wherein the upper substrate is smaller than the lower substrate.

12. The liquid crystal display panel of claim 9, wherein the lower substrate has a plurality of data pads and gate pads disposed on the lower substrate.

13. The liquid crystal display panel of claim 12, wherein the data pads and gate pads are a double bank arrangement having corresponding pads arranged at opposite sides of the lower substrate.

14. The liquid crystal display panel of claim 12, wherein the data pads and gate pads are a single bank arrangement having the data pads or the gate pads arranged along one side of the substrate, respectively.

15. The liquid crystal display panel of claim 9, wherein the seal pattern is printed in advance on the lower substrate.

16. A tray for filling a liquid crystal material into a liquid crystal panel, the liquid crystal panel comprising an upper substrate, a lower substrate, a seal pattern having an injection port at a peripheral portion of the seal pattern, and an indentation that is indented from a side of the lower substrate to an injection port, the tray comprising:

a body defining a cavity therein; and a protruded portion extending from said body and corresponding to the indentation of the liquid crystal panel.

17. The tray of claim 16, wherein the protruded portion has a terminal having a wider width than the injection port.

18. A system for filling a liquid crystal material into a liquid crystal panel, the system comprising:

a liquid crystal display panel including:

an upper substrate;

a lower substrate assembled with the upper substrate, the lower substrate having an indentation that is indented from a side of the lower substrate to an injection port;

liquid crystal material interposed between the upper and lower substrates; and a seal pattern formed between the upper and lower substrates, the seal pattern having the injection port; and a tray including:

a body defining a cavity therein; and a protruded portion extending from said body and corresponding to the indentation of the liquid crystal display panel.

19. The method of claim 1, wherein a cleaning step is not needed.

* * * * *